United States Patent
Gu et al.

(10) Patent No.: US 9,562,820 B2
(45) Date of Patent: Feb. 7, 2017

(54) PRESSURE SENSOR WITH REAL TIME HEALTH MONITORING AND COMPENSATION

(71) Applicant: MKS Instruments, Inc., Andover, MA (US)

(72) Inventors: Lei Gu, Lexington, MA (US); Paul D. Lucas, Melrose, MA (US); Stephen F. Bart, Newton, MA (US); Philip W. Sullivan, Lexington, MA (US)

(73) Assignee: MKS Instruments, Inc., Andover, MA (US)

( * ) Notice: Subject to any disclaimer, the term of this patent is extended or adjusted under 35 U.S.C. 154(b) by 229 days.

(21) Appl. No.: 14/072,188

(22) Filed: Nov. 5, 2013

(65) Prior Publication Data

US 2014/0238103 A1    Aug. 28, 2014

Related U.S. Application Data

(60) Provisional application No. 61/770,817, filed on Feb. 28, 2013, provisional application No. 61/817,724, filed on Apr. 30, 2013.

(51) Int. Cl.
| | |
|---|---|
| *G01L 7/08* | (2006.01) |
| *G01L 19/00* | (2006.01) |
| *G01L 9/00* | (2006.01) |

(52) U.S. Cl.
CPC ......... *G01L 19/0092* (2013.01); *G01L 9/0072* (2013.01)

(58) Field of Classification Search
CPC .... G01L 19/0092; G01L 19/04; G01L 9/0072; G01L 9/008; G01L 9/0041; G01L 9/0051
See application file for complete search history.

(56) References Cited

U.S. PATENT DOCUMENTS

| | | |
|---|---|---|
| 4,322,980 A | 4/1982 | Suzuki et al. |
| 4,466,289 A | 8/1984 | Lam |
| (Continued) | | |

FOREIGN PATENT DOCUMENTS

| | | |
|---|---|---|
| DE | 102006011545 | 9/2007 |
| DE | 102006024671 | 11/2007 |
| (Continued) | | |

OTHER PUBLICATIONS

International Preliminary Report on Patentability dated Sep. 11, 2015 from corresponding PCT Application No. PCT/US2014/016451.

(Continued)

*Primary Examiner* — Natalie Huls
(74) *Attorney, Agent, or Firm* — McDermott Will & Emery LLP

(57) ABSTRACT

A pressure sensor may measure gas or liquid pressure. A chamber may have an inlet that receives the gas or liquid. A flexible diaphragm may be within the chamber that has a surface exposed to the gas or liquid after it flows through the inlet. A pressure sensor system may sense changes in the flexible diaphragm caused by changes in the pressure of the gas or liquid. A pressure-insensitive sensor system may sense changes in the flexible diaphragm that are not caused by changes in the pressure of the gas or liquid. The pressure-insensitive sensor system may be insensitive to changes in the flexible diaphragm caused by changes in the pressure of the gas or liquid.

12 Claims, 14 Drawing Sheets

(56) References Cited

U.S. PATENT DOCUMENTS

| | | | |
|---|---|---|---|
| 5,107,710 A | 4/1992 | Huck et al. | |
| 5,291,788 A | 3/1994 | Oohata et al. | |
| 5,377,524 A | 1/1995 | Wise et al. | |
| 5,663,506 A | 9/1997 | Moore et al. | |
| 5,702,619 A | 12/1997 | Kurtz et al. | |
| 6,216,726 B1 | 4/2001 | Brown | |
| 6,326,682 B1 | 12/2001 | Kurtz et al. | |
| 6,732,590 B1 | 5/2004 | Gottlieb et al. | |
| 6,837,112 B2 | 1/2005 | Ferran et al. | |
| 6,910,381 B2 | 6/2005 | Albert | |
| 6,973,836 B2 | 12/2005 | Katsumata et al. | |
| 7,194,923 B2 | 3/2007 | Yoshida et al. | |
| 7,195,594 B2 | 3/2007 | Eigler et al. | |
| 7,311,008 B2 | 12/2007 | Langer et al. | |
| 7,464,599 B2 | 12/2008 | Silverbrook et al. | |
| 7,509,869 B2 | 3/2009 | Liu et al. | |
| 7,706,995 B2 * | 4/2010 | Sullivan | G01L 9/0072 702/85 |
| 8,216,882 B2 | 7/2012 | Lin et al. | |
| 8,316,718 B2 | 11/2012 | Lin et al. | |
| 8,387,464 B2 | 3/2013 | McNeil et al. | |
| 8,487,387 B2 | 7/2013 | Lin et al. | |
| 2007/0150819 A1 | 6/2007 | Goodman et al. | |
| 2007/0233412 A1 | 10/2007 | Gotoh et al. | |
| 2009/0301211 A1 * | 12/2009 | Yoshikawa | G01L 9/0072 73/724 |
| 2010/0058874 A1 | 3/2010 | Dannhauer | |
| 2011/0126632 A1 | 6/2011 | McNeil et al. | |
| 2011/0209553 A1 * | 9/2011 | Crivelli | G01L 9/0052 73/721 |
| 2012/0042731 A1 | 2/2012 | Lin et al. | |
| 2012/0256282 A1 | 10/2012 | Lin et al. | |
| 2012/0297884 A1 * | 11/2012 | Gamage | G01L 9/0047 73/717 |
| 2013/0189160 A1 * | 7/2013 | Blankenship | G01L 9/0075 422/88 |
| 2014/0150559 A1 | 6/2014 | Ishihara et al. | |
| 2014/0298884 A1 * | 10/2014 | Mindlin | G01L 9/0047 73/1.63 |
| 2015/0040674 A1 | 2/2015 | Ishihara et al. | |

FOREIGN PATENT DOCUMENTS

| | | |
|---|---|---|
| JP | 06307962 | 11/1994 |
| WO | WO9845675 | 10/1998 |
| WO | WO0116571 | 3/2001 |

OTHER PUBLICATIONS

Office Action dated Aug. 17, 2015 from corresponding Taiwan Patent Application No. 103106391.
International Search Report and the Written Opinion from corresponding PCT Application No. PCT/US2008/059986.

* cited by examiner

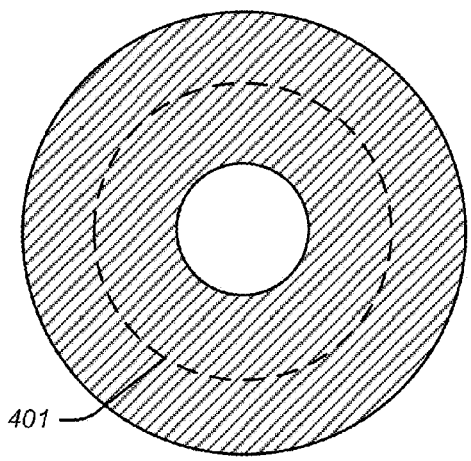 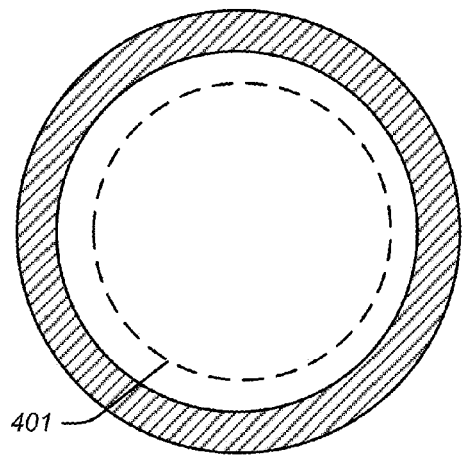
FIG. 4A                    FIG. 4B
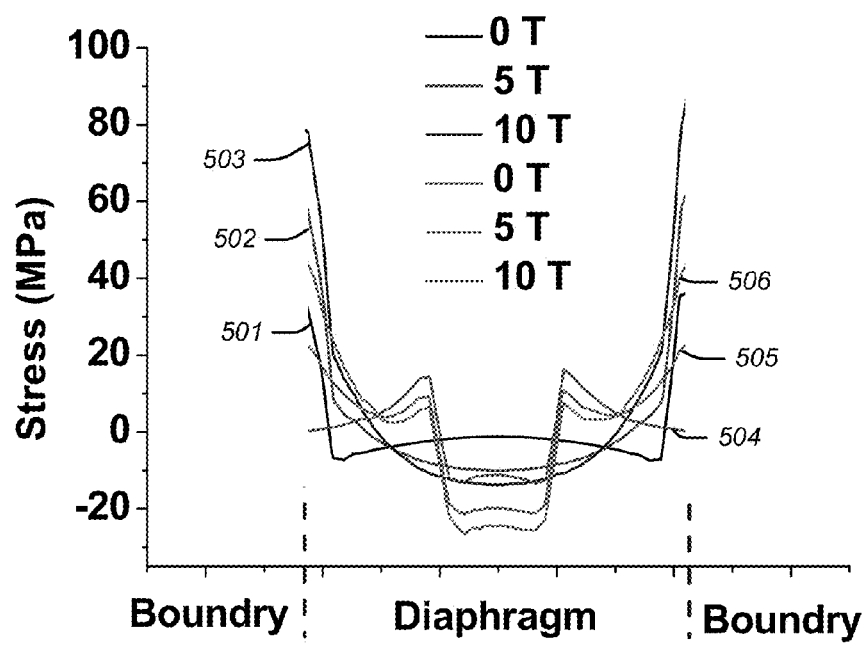
FIG. 5

PRESSURE SENSOR WITH REAL TIME HEALTH MONITORING AND COMPENSATION

CROSS-REFERENCE TO RELATED APPLICATIONS

This application is based upon and claims priority to U.S. provisional patent application 61/770,817, entitled "Pressure Sensor with Integrated Health Monitoring," filed Feb. 28, 2013, and U.S. provisional patent application 61/817,724, entitled "Pressure Sensor with Integrated Monitoring," filed Apr. 30, 2013. The entire content of each of these applications is incorporated herein by reference.

BACKGROUND

Technical Field

This application relates to pressure sensors, including pressure sensors that expose a flexible diaphragm to gas or liquid having a pressure to be measured.

Description of Related Art

Pressure sensors that utilize a flexible diaphragm may be used in a wide variety of applications. One side of the flexible diaphragm may be exposed to gas or liquid having the pressure to be measured. The other side may be isolated from the gas or liquid, but be exposed to a sealed chamber. Changes in the pressure to be measured may cause corresponding changes in the flexure of the flexible diaphragm. Measurement of these changes can serve as indications of the pressure changes.

Some pressure sensors are used in environments that can damage the flexible diaphragm. For example, some pressure sensors are used in chemical vapor deposition (CVD) systems. These systems can cause a steady buildup of sediment on the flexible diaphragm and/or changes in the flexible diaphragm due to atomic doping. This damage to the flexible diaphragm can adversely affect the accuracy of pressure measurements that are made.

One approach to dealing with this problem may be to periodically replace the flexible diaphragm. However, this can result in both premature and unduly delayed replacements and lost use of the system during the replacement process.

Another approach may be to perform periodic calibration tests on the flexible diaphragm. Again, however, the system may need to be taken off-line and hence temporarily removed from use.

SUMMARY

A pressure sensor may measure gas or liquid pressure. A chamber may have an inlet that receives the gas or liquid. A flexible diaphragm may be within the chamber that has a surface exposed to the gas or liquid after it flows through the inlet. A pressure sensor system may sense changes in the flexible diaphragm caused by changes in the pressure of the gas or liquid. A pressure-insensitive sensor system may sense changes in the flexible diaphragm that are not caused by changes in the pressure of the gas or liquid. The pressure-insensitive sensor system may be insensitive to changes in the flexible diaphragm caused by changes in the pressure of the gas or liquid.

The pressure-insensitive sensor system may include a local sensor at a pressure-insensitive location on or within the flexible diaphragm that experiences changes, but not in response to changes in the pressure of the gas or liquid.

The pressure-insensitive sensor system may include multiple local sensors at different pressure-insensitive locations on or within the flexible diaphragm. From outputs of the multiple local sensors, an extrapolation processing system may extrapolate changes at a pressure-insensitive location on or within the flexible diaphragm that experiences changes, but not in response to changes in the pressure of the gas or liquid.

The flexible diaphragm may have a line of pressure-insensitive locations that each experience changes, but not in response to changes in the pressure of the gas or liquid. At least two of the multiple local sensors may be located on opposite sides or on the same side of this line.

The extrapolation processing system may calculate stress at the pressure-insensitive location in accordance with the following equation:

$$\frac{\sigma_1' \sigma_2'' - \sigma_1'' \sigma_2'}{\sigma_1' + \sigma_2'' - \sigma_1'' - \sigma_2'} + \sigma_{initial}$$

wherein: $\sigma_1'$ and $\sigma_2'$ is an output from one of the multiple local sensors while subject to materially different pressures P1 and P2, respectively; $\sigma_1''$ and $\sigma_2''$ is an output from the other of the multiple local sensors while subject to the same materially different pressures P1 and P2, respectively; and $\sigma_{initial}$ is any stress that was placed on the flexible diaphragm prior to exposure to the pressures P1 and P2 and that remains on the flexible diaphragm during the exposure to the pressures P1 and P2.

The different pressure-insensitive locations of the multiple local sensors may have substantial planar symmetry with respect to a surface of the flexible diaphragm.

The flexible diaphragm may be circular and the pressure-insensitive location may be on a substantially concentric circle having a radius within the range of 0.63 of the radius of the flexible diaphragm, plus or minus 0.2.

The pressure-insensitive sensor system may include a local sensor on a surface of the flexible diaphragm that is or that is not exposed to the gas or liquid. The pressure-insensitive sensor system may instead be a local sensor embedded within the flexible diaphragm.

The pressure-insensitive sensor system may not include a local sensor on or within the flexible diaphragm. The flexible diaphragm may be a first flexible diaphragm; the pressure-insensitive sensor system may include a second flexible diaphragm that is separate from the first flexible diaphragm; and the second flexible diaphragm may have a surface that is exposed to the gas or liquid after it flows through the inlet.

The size, shape, and material composition of the second flexible diaphragm may be substantially the same as the first flexible diaphragm. The size, shape, or material composition of the second flexible diaphragm may instead be substantially different from the first flexible diaphragm.

Changes in the second flexible diaphragm not in response to changes in the pressure of the gas or liquid may be measured in any of the ways discussed above in connection with the first flexible diaphragm.

The second flexible diaphragm may have two surfaces that are both exposed to the gas or liquid after it flows through the inlet.

The pressure sensor system may include a variable capacitor that has a capacitance that changes in response to changes in the pressure of the gas or liquid, and the flexible diaphragm may be made of electrically-conductive material and be part of the variable capacitor.

The pressure-insensitive sensor system may include a strain gauge that has a resistance that changes in response to changes not caused by changes in the pressure of the gas or liquid.

The pressure sensor may include a compensation system that compensates measurements made by the pressure sensor system based on changes to the flexible diaphragm sensed by the pressure-insensitive sensor system.

The pressure sensor may include a life measurement system that provides information indicative of a projected remaining life of the pressure sensor system based on changes to the flexible diaphragm sensed by the pressure-insensitive sensor system.

The life measurement system may include a warning system that issues a warning when the projected remaining life of the pressure sensor system equals or exceeds a threshold.

These, as well as other components, steps, features, objects, benefits, and advantages, will now become clear from a review of the following detailed description of illustrative embodiments, the accompanying drawings, and the claims.

BRIEF DESCRIPTION OF DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

FIGS. 4A and 4B illustrate examples of two types of different, non-uniform, sediment deposition patterns.

FIG. 5 illustrates stress at various locations in gas-exposed sides of a diaphragm under various levels of pressure that has been subject to two types of non-uniform sediment deposition.

DETAILED DESCRIPTION OF ILLUSTRATIVE EMBODIMENTS

Illustrative embodiments are now described. Other embodiments may be used in addition or instead. Details that may be apparent or unnecessary may be omitted to save space or for a more effective presentation. Some embodiments may be practiced with additional components or steps and/or without all of the components or steps that are described.

Figure 1A:
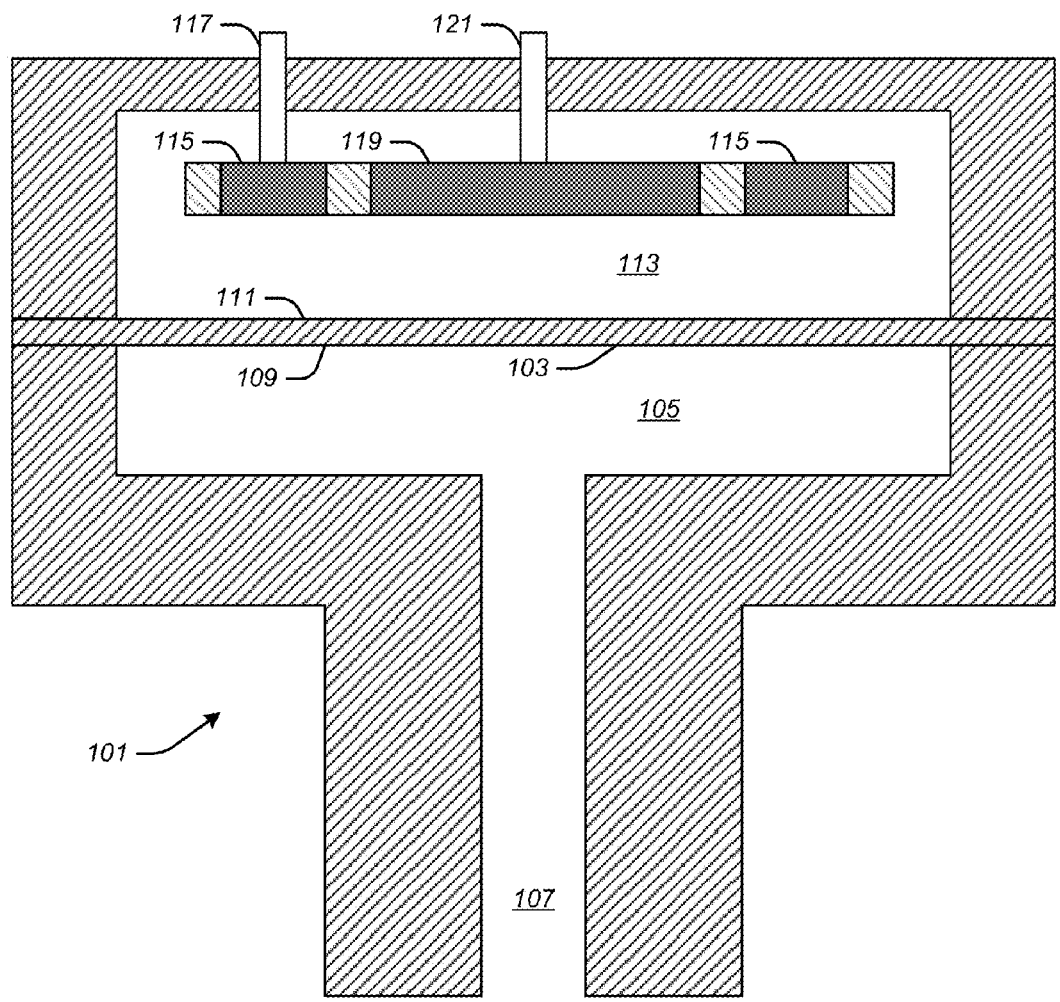
FIG. 1A illustrates a cross-sectional view of a prior art pressure sensor that utilizes a flexible diaphragm.

FIG. 1A illustrates a cross-sectional view of a prior art pressure sensor 101 that utilizes a flexible diaphragm 103. The prior art pressure sensor 101 includes a chamber 105 having an inlet 107 that receives gas or liquid at a pressure to be measured.

The flexible diaphragm 103 has a surface 109 that is exposed to the gas or liquid after it flows through the inlet 107. The flexible diaphragm 103 has another surface 111 that is not exposed to the gas or liquid, but rather forms a wall of a second chamber 113. Also within the second chamber 113 is an insulated annular reference electrode 115 having an electrical connection 117 and an insulated circular sensing electrode 119 having an electrical connection 121.

The flexible diaphragm 103 may be made of any material, such as silicon, Sapphire, ceramic, stainless steel, and/or a nickel alloy. The material may permit the diaphragm 103 to flex, but may not be permeable to any of the gas or liquids that have a pressure to be measured. The flexible diaphragm 103 may be of any shape, such as circular, oval, rectangular, or triangular. The flexible diaphragm 103 may have an electrically-conductive surface.

Changes in pressure of gas or liquid at the inlet 107 may cause changes in the flexure of the flexible diaphragm 103. The reference electrode 115, the sensing electrode 119, and the flexible diaphragm 103 may cooperate to form a capacitor whose capacitance changes in response to changes in the flexure of the diaphragm 103. This change in capacitance can be measured by measuring changes in the capacitance between 119 and 103, or between 115 and 103. In addition, both of these measurements can be used differentially to improve measurement accuracy.

Other means may be employed in addition or instead to detect changes in the flexure of the diaphragm 103 due to change in the pressure of the gas or liquid. For example, one or more strain gauges (e.g., piezoresistive or piezoelectric) may be mounted on or within the diaphragm 103 at one or more locations that are sensitive to changes in the flexure of the diaphragm 103 that result from changes in pressure of gas or liquid at the inlet 107. Other techniques may in addition or instead be employed to detect and measure changes in the flexure of the diaphragm 103, such as optical and/or ultrasound techniques. A still further approach may be to drive 115 and 103 or 119 and 103 with an electrostatic force and to measure the stiffness of the diaphragm during this driving effort. One method may be to drive one electrode pair with a variable frequency sinusoidal (AC) voltage and measure the capacitance output of the other electrode pair. This may allow measurement of the resonant frequency of the diaphragm. Changes in the resonant frequency may allow detection of changes in the diaphragm stiffness.

Figure 1B:
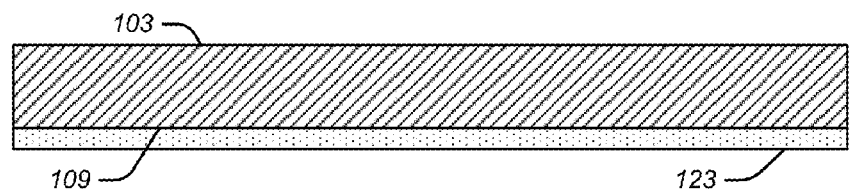
FIG. 1B illustrates an enlarged cross-sectional view of a portion of the flexible diaphragm illustrated in FIG. 1A after sediment has been deposited on a surface of the flexible diaphragm that was exposed to gas or liquid during use of the prior art pressure sensor.

FIG. 1B illustrates an enlarged cross-sectional view of a portion of the flexible diaphragm 103 illustrated in FIG. 1A after sediment 123 has been deposited on the surface 109 of the flexible diaphragm 103 that was exposed to gas or liquid during use of the prior art pressure sensor 101. Although the sediment 123 is illustrated as uniform, it may in fact not be uniform. For example, the sediment 123 may be thicker near the perimeter as contrasted to near the center, or vice versa. The flexible diaphragm 103 may also or instead be damaged by atomic doping, as explained above.

The deposit of the sediment 123 and/or changes caused by atomic doping may cause the diaphragm 103 to flex and/or may alter the flexure sensitivity of the diaphragm 103 to changes in the pressure of the gas or liquid. As explained above, this damage to the flexible diaphragm can adversely affect the accuracy of the pressure measurements that are made by the pressure sensor 101.

There may be pressure-insensitive locations on the flexible diaphragm 103. These locations may experience changes in stress and/or displacement as sediment is deposited on the flexible diaphragm 103 and/or as the flexible diaphragm 103 is altered by atomic doping. However, these locations may not experience changes in stress and/or displacement merely when the pressure of gas or liquid at the inlet 107 changes.

Figure 2A:
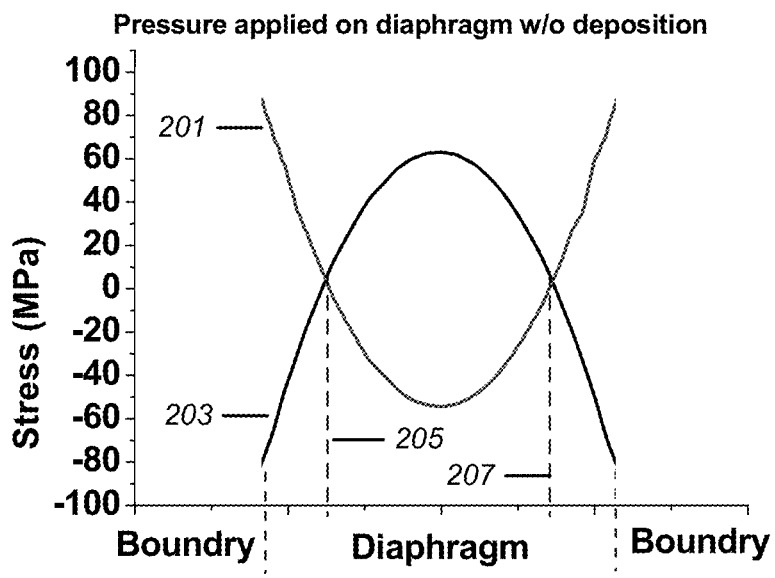
FIG. 2A is a graph of stress on a gas or liquid-exposed side and a dry side of a flexible diaphragm that has pressure applied to it, but without any sediment deposition.

FIG. 2A is a graph of stress on a gas or liquid-exposed side 201 and a dry side 203 of a flexible diaphragm that has pressure applied to it, but without any sediment deposition. As illustrated in the figure, pressure-insensitive locations 205 and 207 on the diaphragm show no stress in the flexible diaphragm, notwithstanding the application of pressure to it.

Figure 2B:
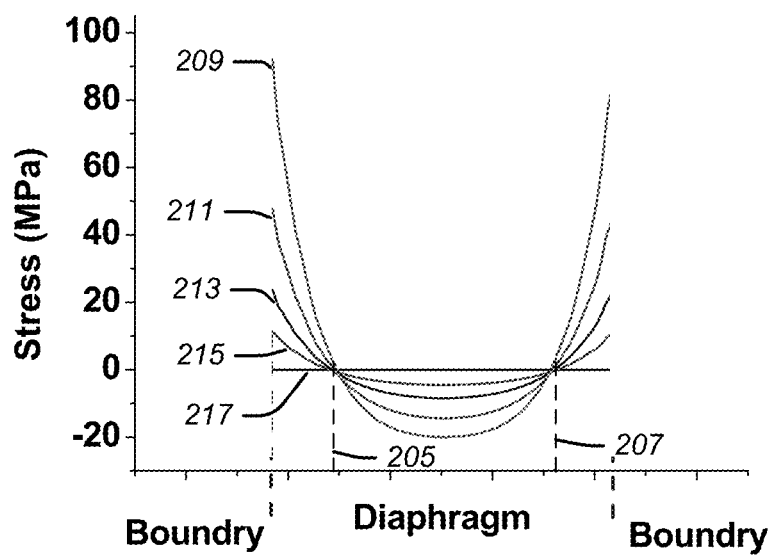
FIG. 2B is a graph of stress on one side of the same flexible diaphragm that has various levels of pressure applied to it, but again without any sediment deposition.

FIG. 2B is a graph of stress on one side of the same flexible diaphragm that has various levels of pressure applied to it, but again without any sediment deposition. Trace 209 illustrates 10 Torr, 211 illustrates 5 Torr, 213 illustrates 2.5 Torr, 215 illustrates 1 Torr, and 217 illustrates 0 Torr of applied pressure. As illustrated in this figure, pressure-insensitive locations 205 and 207 on the diaphragm continue to show no stress in the flexible diaphragm, notwithstanding the application of these various pressures to it.

Figure 3A:
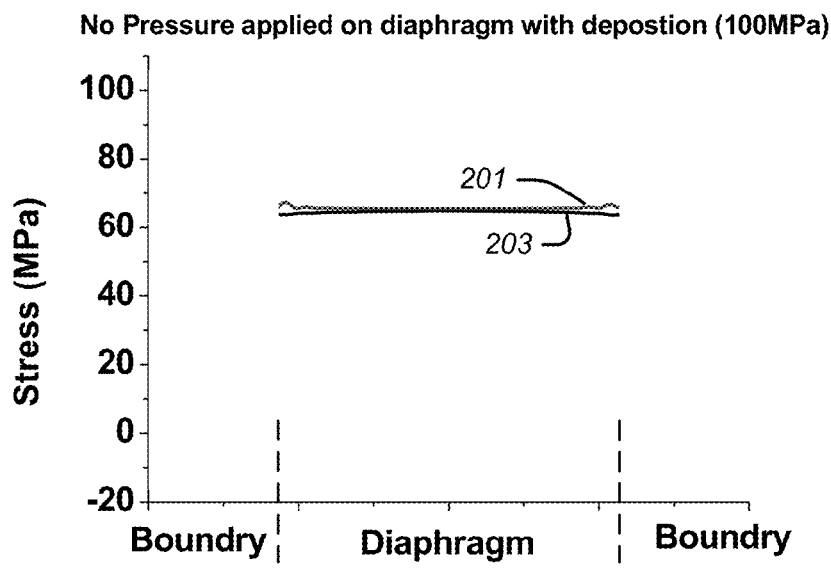
FIG. 3A is a graph of stress on the gas or liquid-exposed side and the dry side of the same flexible diaphragm when no pressure is applied to it, but that has significant sediment deposition.

FIG. 3A is a graph of stress on the gas or liquid-exposed side 201 and the dry side 203 of the same flexible diaphragm when no pressure is applied to it, but that has significant sediment deposition. As illustrated in the figure, all of the locations on the diaphragm show about the same level of stress.

Figure 3B:
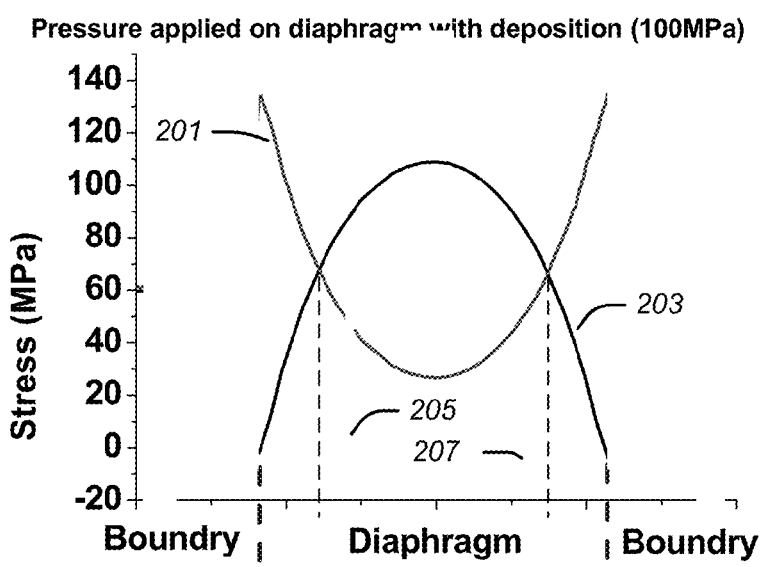
FIG. 3B is a graph of stress on the gas or liquid-exposed side and the dry side of the same flexible diaphragm when pressure is applied to it, and that has significant sediment deposition.

FIG. 3B is a graph of stress on the gas or liquid-exposed side 201 and the dry side 203 of the same flexible diaphragm when pressure is applied to it, and that has significant sediment deposition. As illustrated in the figure, the pressure-insensitive locations 205 and 207 on the diaphragm show stress that reflects stress imposed by sediment deposition. But as also illustrated in FIG. 2A, these same pressure-insensitive locations show no stress, even when pressure is applied to the diaphragm.

The pressure-insensitive locations may constitute a line of locations. Such a line of pressure-insensitive locations, for example, may constitute a circle in the case of a circular diaphragm that is substantially concentric with the circular diaphragm and that has a radius of approximately 0.63 of the radius of the circular diaphragm, plus or minus 0.2. For other configurations of diaphragms, the pressure-insensitive locations may similarly demarcate a line that follows the contour of the perimeter of the diaphragm, but spaced inwardly from it.

The sediment deposition may not be uniform across the surface of the diaphragm. For example, it may be thicker toward the outer edges of the diaphragm, while thinner toward the center or vice versa. A locus of pressure sensitive locations may exist in the case of arbitrary deposited sediment non-uniformity or atomic doping non-uniformity FIGS. 4A and 4B illustrate examples of different, non-uniform, sediment deposition patterns. In FIG. 4A, the area of sediment deposition covers the line 401 of pressure-insensitive locations. In FIG. 4B, the area of sediment deposition does not cover the line 401 of pressure-insensitive locations. The cross-hatching illustrates sediment deposition.

FIG. 5 illustrates stress at various locations in gas-exposed sides of a diaphragm under various levels of pressure that has been subject to non-uniform sediment deposition. Trace 501, 502, and 503 illustrate 1 Torr, 5 Torr and 10 Torr, respectively, for the non-uniform sediment deposition shown in FIG. 4A. Trace 504, 505, and 506 illustrate 1 Torr, 5 Torr, and 10 Torr, respectively, for the non-uniform sediment deposition shown in FIG. 4B. Again, however, there may be pressure-insensitive locations on the diaphragm that show substantially no change in stress, notwithstanding significant changes in applied pressure.

Measuring the amount of changes that occur at one or more of these pressure-insensitive locations may therefore be indicative of the amount of damage to the diaphragm 103 that is caused by sediment deposition and/or atomic doping. Examples of techniques for measuring changes at such pressure-sensitive locations are now described. Others may be used in addition or instead.

Figure 6:
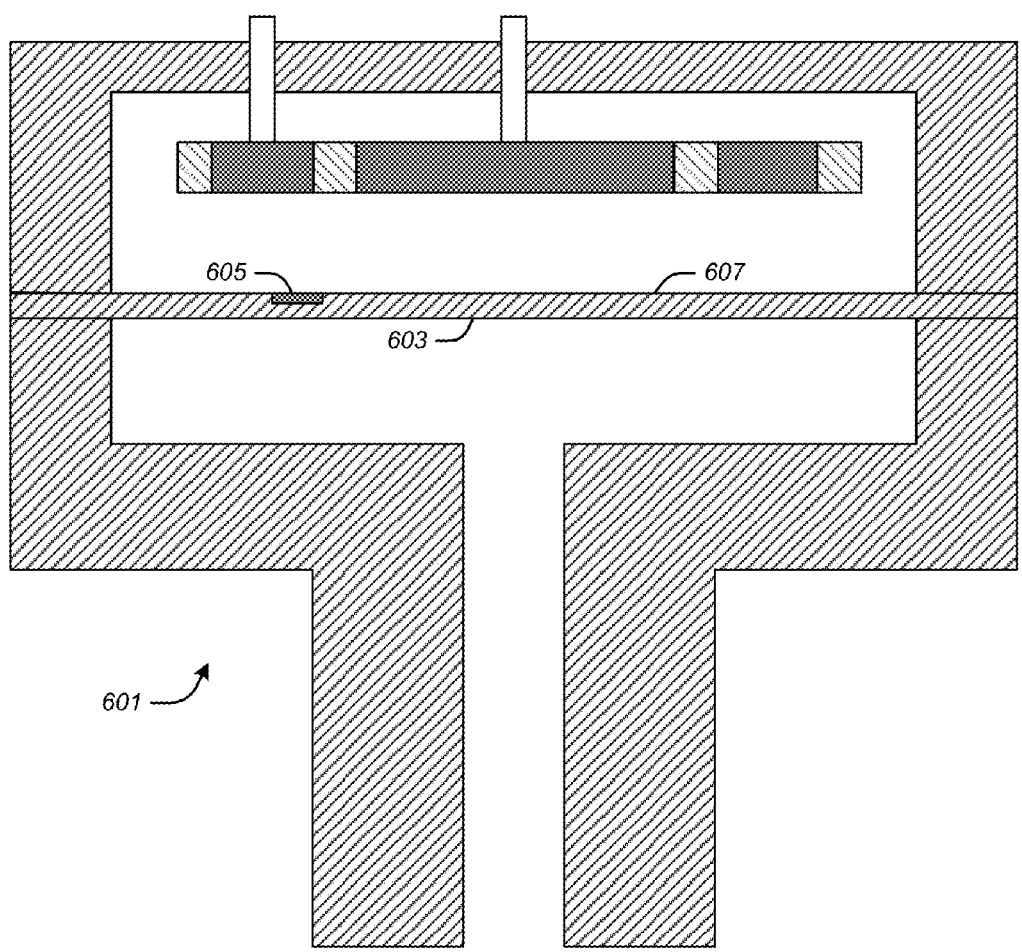
FIG. 6 illustrates a cross-sectional view of an example of a pressure sensor that utilizes a flexible diaphragm and a pressure-insensitive sensor system that includes a strain gauge (e.g., piezoresistive or piezoelectric) at a pressure-insensitive location on a surface of the flexible diaphragm.

FIG. 6 illustrates a cross-sectional view of an example of a pressure sensor 601 that utilizes a flexible diaphragm 603 and a pressure-insensitive sensor system that includes a strain gauge 605 (e.g., piezoresistive or piezoelectric) at a pressure-insensitive location on a surface 607 of the flexible diaphragm 603. Except for the strain gauge 605, all of the components of the pressure sensor 601 may be the same as the corresponding components of the pressure sensor 101, as described above, including all of the variations that have been described above.

The pressure-insensitive sensor system may sense changes in the flexible diaphragm 603 not caused by changes in the pressure of the gas or liquid. The pressure-insensitive sensor system may also be insensitive to changes in the flexible diaphragm 603 that are caused by changes in the pressure of the gas or liquid. The pressure-insensitive location at which the strain gauge 605 is located may be a location that experiences changes, such as changes caused by sediment deposition and/or atomic doping, but not changes caused by changes in the pressure of the gas or liquid. Examples of such locations are illustrated in FIGS. 2A, 2B, and 3B.

The strain gauge 605 may be on or within the flexible diaphragm 603 at a pressure-insensitive location. When on the flexible diaphragm 603, the strain gauge 605 may be attached to either side of the flexible diaphragm 603, such as with glue. When within the flexible diaphragm 603, the strain gauge 605 may be created by doping the flexible diaphragm 603 with the strain gauge at the pressure-insensitive location. The flexible diaphragm 603 may be semiconductor material.

Figure 7A:
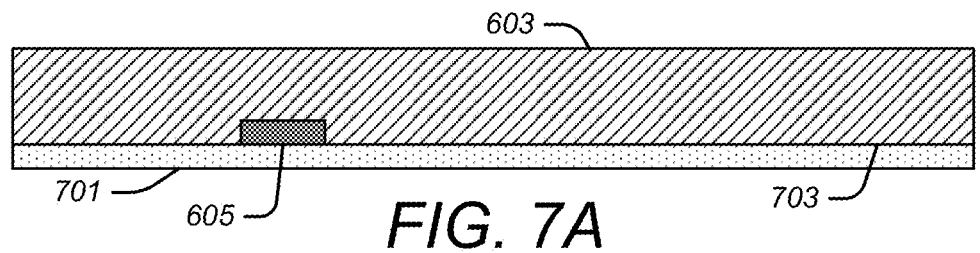
FIGS. 7A-7D illustrate various locations and configurations for the strain gauge at a pressure-insensitive location on the flexible diaphragm 603, as well as sediment deposition that has occurred.
Figure 7B:
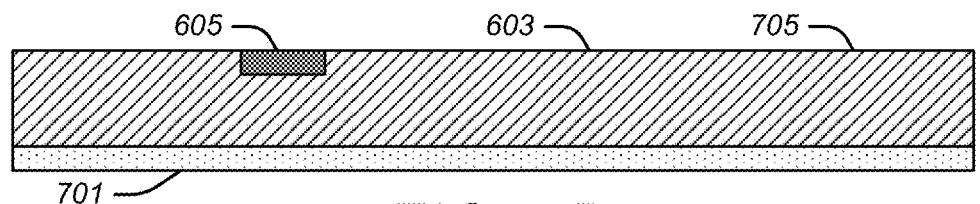
Figure 7C:
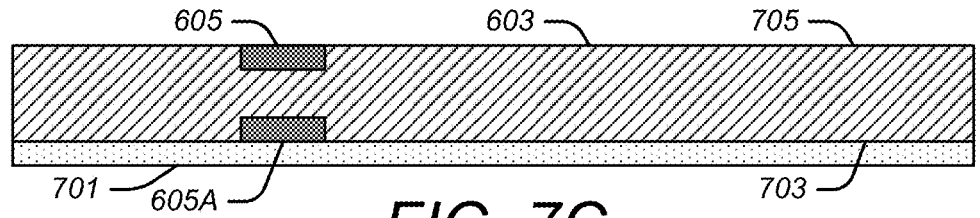
Figure 7D:
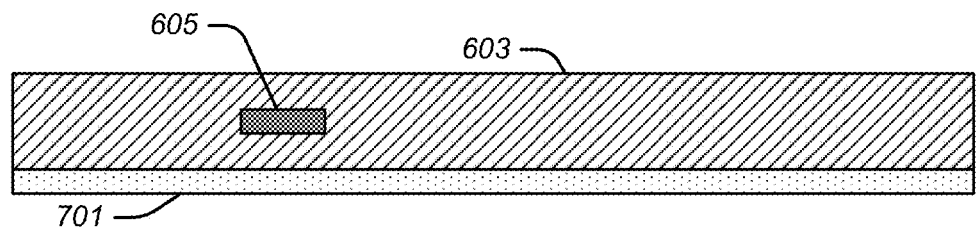

FIGS. 7A-7D illustrate various locations and configurations for the strain gauge 605 at a pressure-insensitive location on the flexible diaphragm 603, as well as sediment deposition 701 that has occurred. FIG. 7A illustrates the strain gauge 605 on gas or liquid-exposed side 703; FIG. 7B illustrates the strain gauge 605 on dry side 705; FIG. 7C illustrates the strain gauge 605 on the dry side 705 and an additional strain gauge 605A on the gas or liquid-exposed side 703; and FIG. 7D illustrates the strain gauge 605 embedded within the flexible diaphragm 603. There may also be multiple strain gauges at multiple pressure-insensitive locations on or within the flexible diaphragm 603. When multiple strain gages are used, an average of their outputs may be used.

Figure 8A:
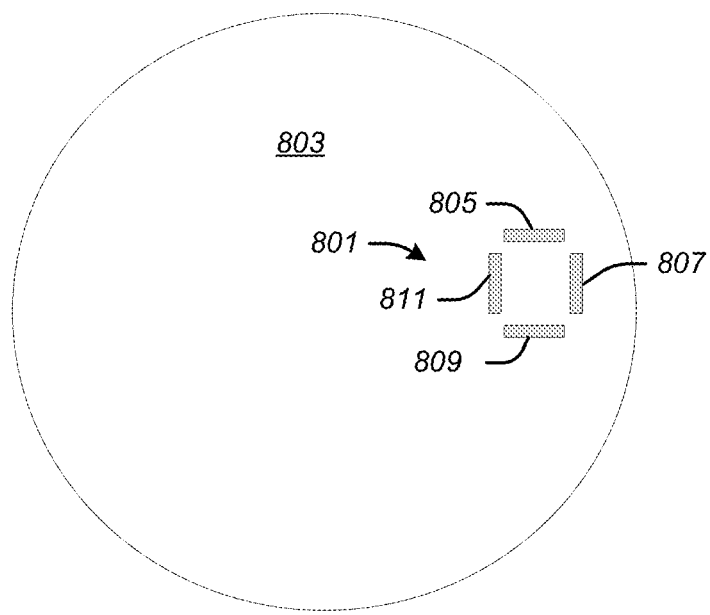
In FIG. 8A illustrates an example of a strain gauge at a pressure-insensitive location on a flexible diaphragm. The strain gauge may include four sensing elements.

In FIG. 8A illustrates an example of a strain gauge 801 at a pressure-insensitive location on a flexible diaphragm 803. The strain gage 801 may be a bridge of piezoresistive elements 805, 807, 809, and 811 arranged in a square. piezoresistive elements 805 and 809 may be oriented to detect stain in one direction, while piezoresistive elements 807 and 811 may be oriented to detect stain in another, orthogonal direction. Each piezoresistive element may change its resistance as a function of stress that is applied to it.

Figure 8B:
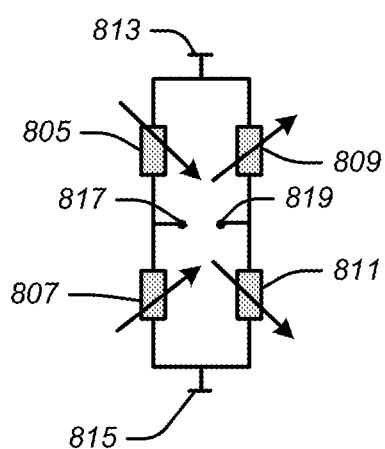
FIG. 8B illustrates an example of electrical connections that may be made between the multiple piezoresistive elements illustrated in FIG. 8A.

FIG. 8B illustrates an example of electrical connections that may be made between the multiple piezoresistive elements illustrated in FIG. 8A. A voltage may be applied across connections 813 and 815, while a differential output may be delivered across connections 817 and 819.

In practice, it may be difficult to accurately identify a pressure-insensitive location on the diaphragm, particularly when this location changes during production due to tolerance variations. Instead, multiple local strain gauges may be placed at pressure-sensitive locations on or within the flexible diaphragm. An extrapolation processing system may receive outputs from the multiple local sensors and extrapolate from these outputs changes at a pressure-insensitive location on or within the flexible diaphragm that experiences changes, but not in response to changes in the pressure of the gas or liquid.

Figure 9A:
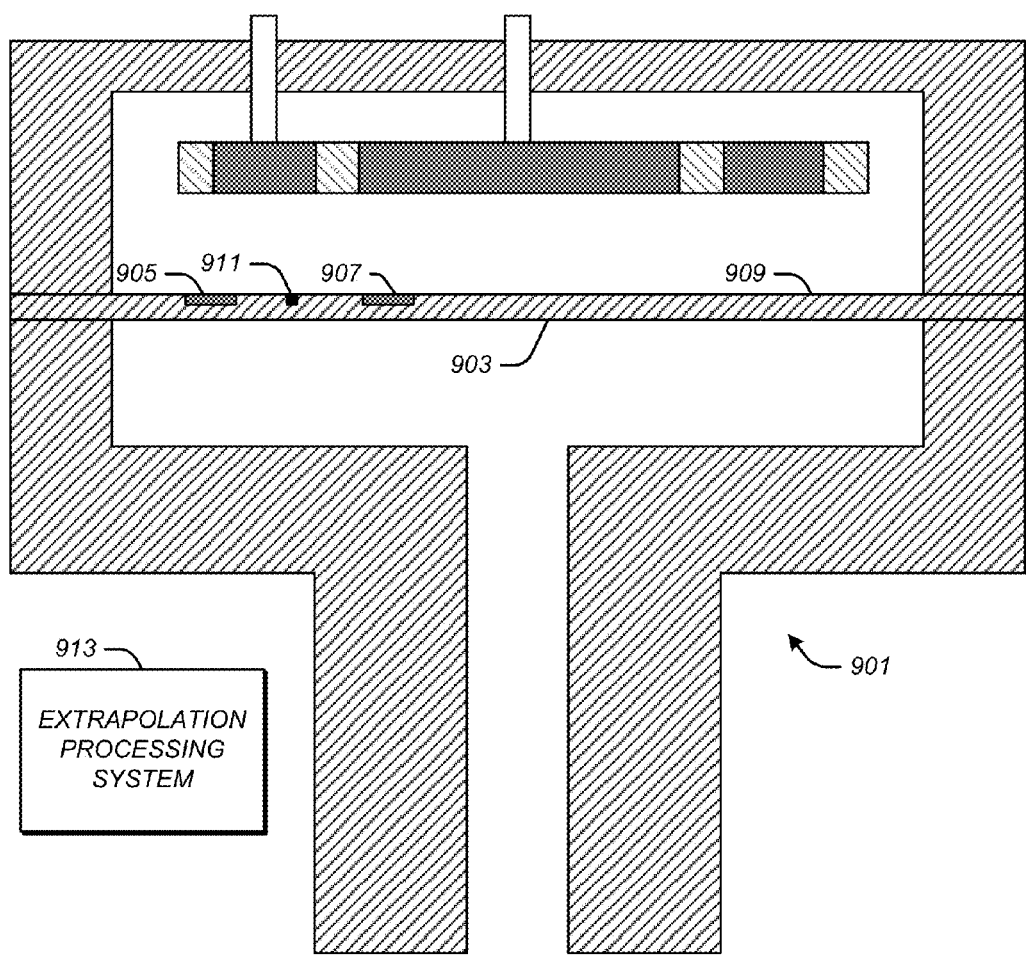
FIG. 9A illustrates a cross-sectional view of an example of a pressure sensor that utilizes a flexible diaphragm and a pressure-insensitive sensor system that includes strain gauges on a surface of the diaphragm at pressure-sensitive locations that are on opposite sides of a line of pressure-insensitive locations.
Figure 9B:
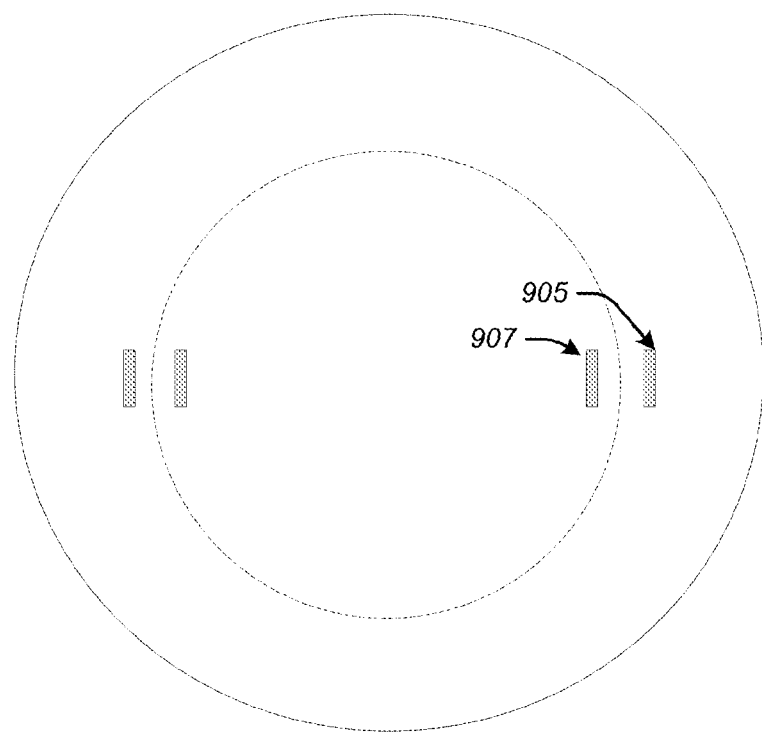
FIGS. 9B and 9C illustrate different pressure-sensitive locations of strain gauges and how they may have substantial planar symmetry with respect to a surface of the flexible diaphragm.
Figure 9C:
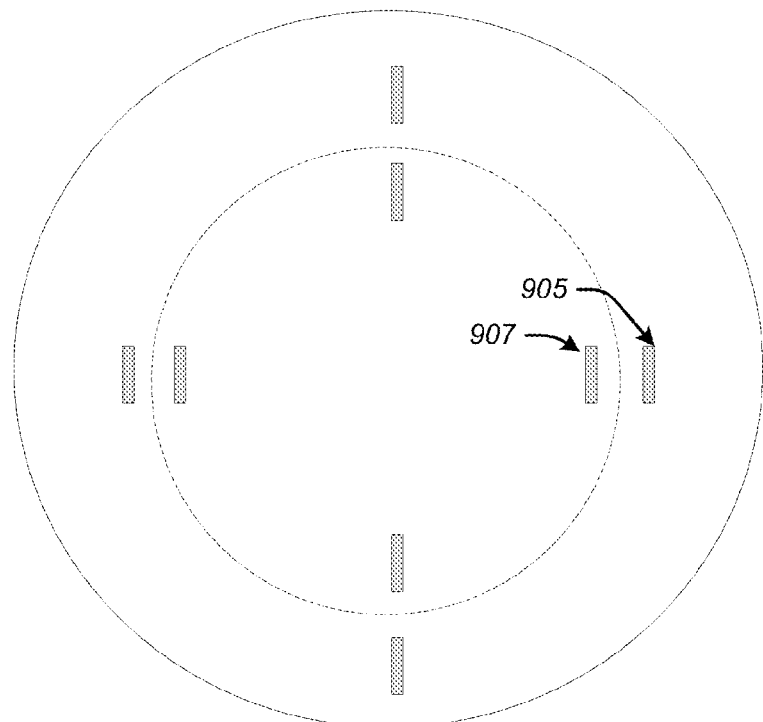

FIG. 9A illustrates a cross-sectional view of an example of a pressure sensor 901 that utilizes a flexible diaphragm 903 and a pressure-insensitive sensor system that includes strain gauges 905 and 907 on a surface 909 of the diaphragm 903 at pressure-sensitive locations that are on opposite sides of a line of pressure-insensitive locations, such as the pressure-insensitive location 911. FIG. 9B and FIG. 9C illustrate the different pressure-sensitive locations of the strain gauges 905 and 907 how they may have substantial planar symmetry with respect to the surface 909 of the flexible diaphragm 903.

FIG. 9 also illustrates an extrapolation processing system 913. From outputs of the strain gauges 905 and 907, the extrapolation processing system 913 may extrapolate changes in stress at a pressure-insensitive location on the flexible diaphragm that experience changes, but not in response to changes in the pressure of the gas or liquid, such as at a pressure-insensitive location 911. The extrapolation processing system 913 may be configured to do so using any approach.

Figure 10:
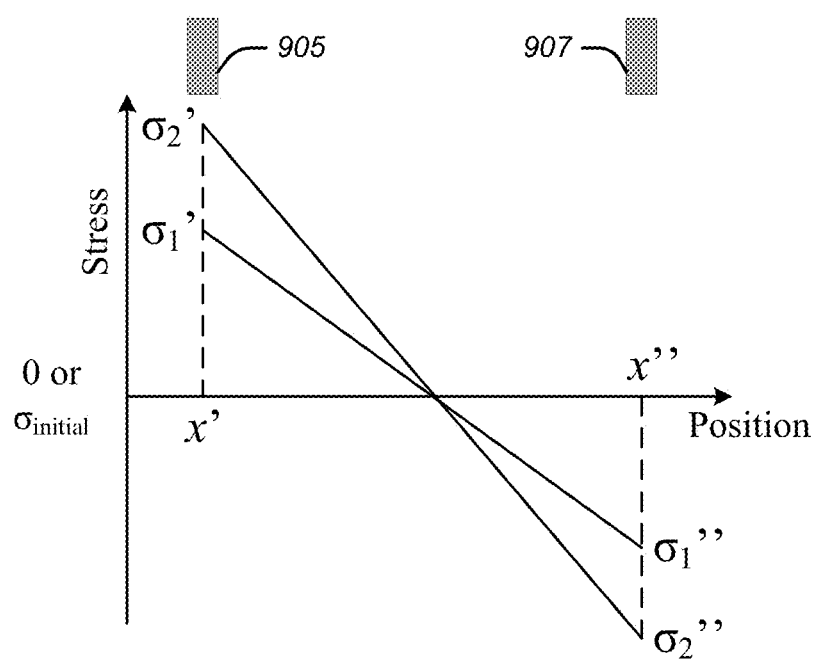
FIG. 10 is a graph illustrating examples of output from the two strain gauges that are illustrated in FIG. 9 at two different pressures and how this information may be used to determine the output of a strain gauge had it been positioned at a pressure-insensitive location.

FIG. 10 is a graph illustrating examples of output from the two strain gauges 905 and 907 that are illustrated in FIG. 9 at two different pressures $P_1$ and $P_2$ and how this information may be used to determine the output of a strain gauge had it been positioned at a pressure-insensitive location. Specifically, FIG. 10 illustrates the stress output of the strain gauge 905 at a location x' and at pressure P1 as $\sigma_1'$ and at a pressure P2 as $\sigma_2'$, and the output of the strain gauge 907 at a location x" and at the pressure P1 as $\sigma_1''$ and at the pressure P2 as $\sigma_2''$.

For example, the extrapolation processing system 913 may be configured to assume a linear variation of stress readings at locations on the flexible diaphragm that are between the locations of the strain gauges 905 and 907, as illustrated in FIG. 10. The extrapolation processing system 913 may be configured to determine the stress at the pressure-insensitive location 911 by determining the intersection of a line between the output values of the two strain gauges at the pressure P1 and a line between the output values of the two strain gauges at the pressure P2, as also illustrated in FIG. 10. Mathematically, the extrapolation processing system 913 may be configured to compute the stress at this pressure-insensitive location 911 in accordance with the following equation:

$$\frac{\sigma_1' \sigma_2'' - \sigma_1'' \sigma_2'}{\sigma_1' + \sigma_2'' - \sigma_1'' - \sigma_2'} + \sigma_{initial}$$

wherein $\sigma_{initial}$ is any stress that was placed on the flexible diaphragm prior to exposure to the pressures P1 and P2.

Except for what has been described above, the various components of the pressure sensor 901 may be the same as the corresponding components of the pressure sensors 101 and 601 illustrated in FIGS. 1 and 6, respectively, as described above, including all of the variations that have been described above.

The multiple pressure sensors that are used need not be on opposite sides of the line of pressure-insensitive locations. For example, they may both be on the inside or outside of a surface demarcated by this line.

Figure 11:
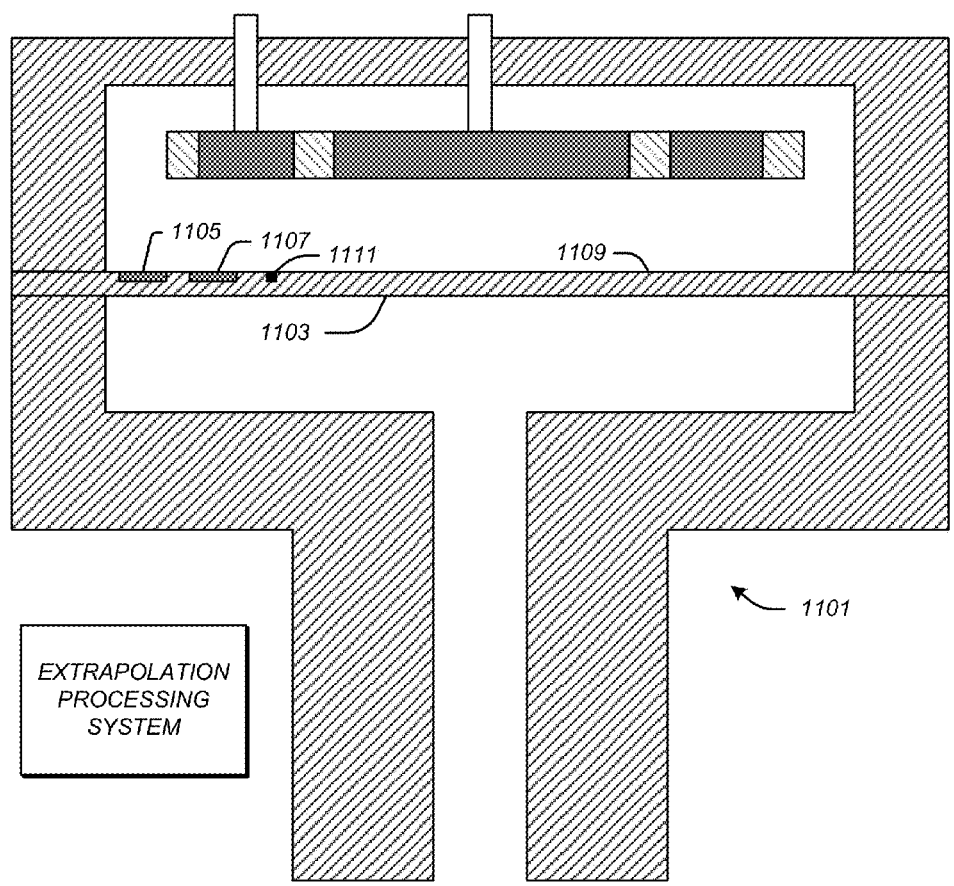
FIG. 11 illustrates a cross-sectional view of an example of a pressure sensor that utilizes a flexible diaphragm and a pressure-insensitive sensor system that includes strain gauges on a surface of the diaphragm at pressure-sensitive locations on outside of a line of pressure-insensitive locations.

FIG. 11 illustrates a cross-sectional view of an example of a pressure sensor 1101 that utilizes a flexible diaphragm 1103 and a pressure-insensitive sensor system that includes strain gauges 1105 and 1107 on a surface 1109 of the diaphragm 1103 at pressure-sensitive locations on the outside of a surface demarcated by a line of pressure-insensitive locations, such as a pressure-insensitive location 1111. The different pressure-sensitive locations of the strain gauges 1105 and 1107 may have substantial planar symmetry with respect to the surface 1109 of the flexible diaphragm 1103.

Except for what has just been described, the various components of the pressure sensor 1101 may be the same as the corresponding components of the pressure sensors 101, 601, and 901 illustrated in FIGS. 1, 6, and 9, respectively, as described above, including all of the variations that have been described above.

Figure 12:
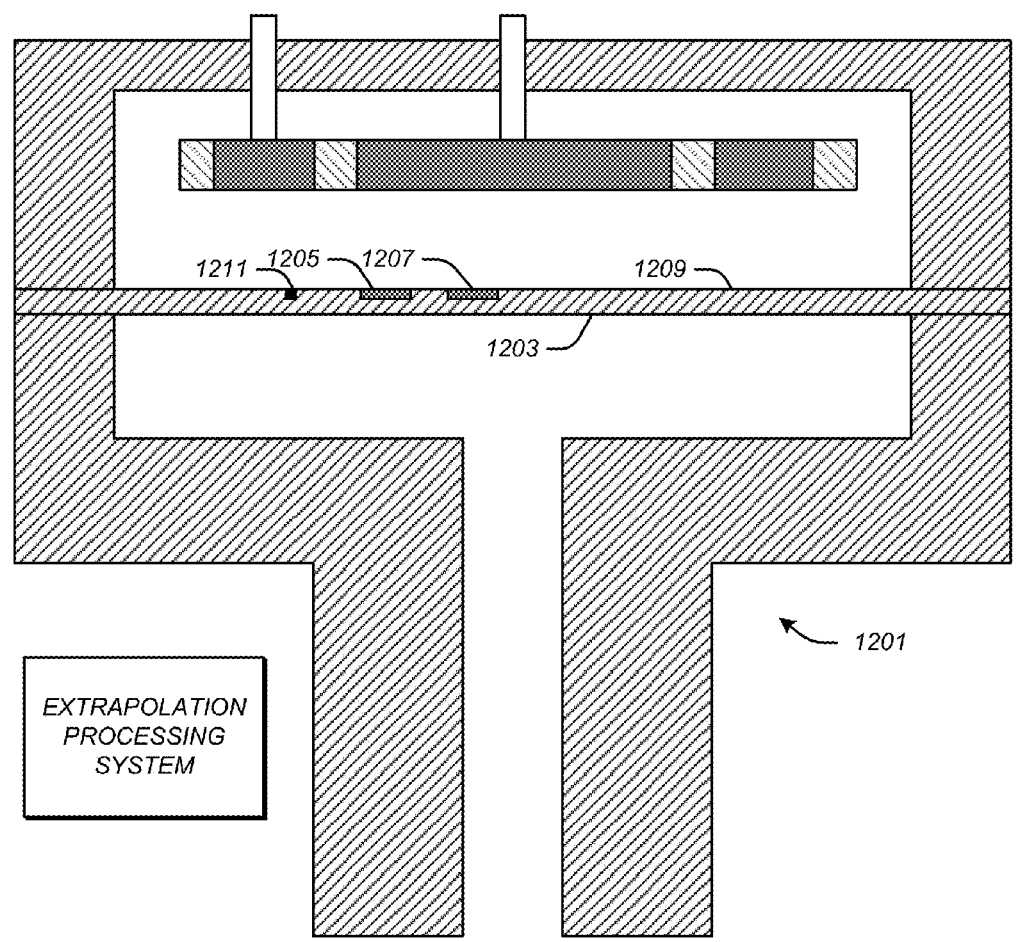
FIG. 12 illustrates a cross-sectional view of an example of a pressure sensor that utilizes a flexible diaphragm and a pressure-insensitive sensor system that includes strain gauges on a surface of the diaphragm at pressure-sensitive locations on the inside of a surface demarcated by a line of pressure-insensitive locations.

FIG. 12 illustrates a cross-sectional view of an example of a pressure sensor 1201 that utilizes a flexible diaphragm 1203 and a pressure-insensitive sensor system that includes strain gauges 1205 and 1207 on a surface 1209 of the diaphragm 1203 at pressure-sensitive locations on the inside of a surface demarcated by a line of pressure-insensitive locations, such as the pressure-insensitive location 1211. The different pressure-sensitive locations of the strain gauges 1205 and 1207 may have substantial planar symmetry with respect to the surface 1209 of the flexible diaphragm 1203.

Except for what has just been described, the various components of the pressure sensor 1201 may be the same as the corresponding components of the pressure sensors 101, 601, and 901 illustrated in FIGS. 1, 6, and 9, respectively, as described above, including all of the variations that have been described above.

The pressure-insensitive sensor system may not include any local sensor on or within the flexible diaphragm. Instead, the pressure-insensitive sensor may include a completely separate probe that is subject to the same environment that cases sediment to be deposited on and/or atomic doping of the diaphragm of the pressure sensor. Damage to this separate probe caused by deposited sediment and/or the atomic doping may thus be indicative of damage caused to the flexible diaphragm. Examples of such separate apparatus are now described and illustrated. Other approaches may be used in addition or instead.

Figure 13:
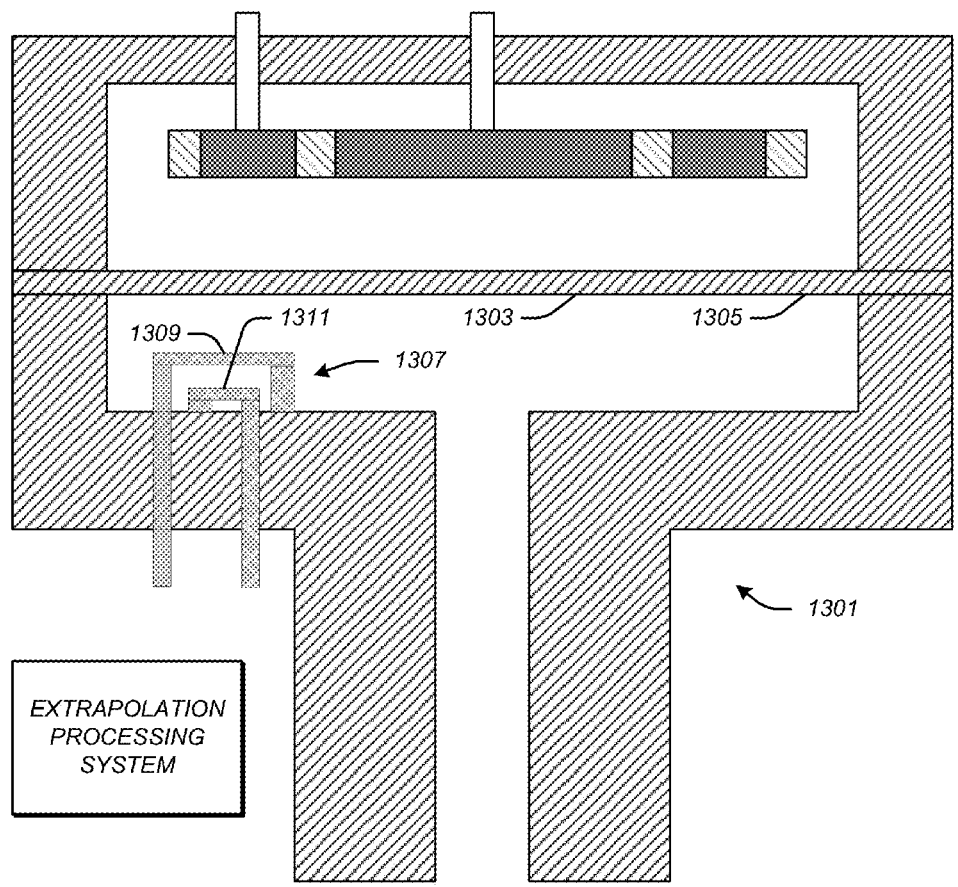
FIG. 13 illustrates a cross-sectional view of an example of a pressure sensor that utilizes a flexible diaphragm that has a surface that is exposed to gas or liquid having a pressure to be measured and a separate probe that is exposed to the same gas or liquid and thus experiences substantially the same sediment deposits and atomic doping.

FIG. 13 illustrates a cross-sectional view of an example of a pressure sensor 1301 that utilizes a flexible diaphragm 1303 that has a surface 1305 that is exposed to gas or liquid having a pressure to be measured and a separate probe 1307 that is exposed to the same gas or liquid and thus experiences substantially the same sediment deposits and atomic doping.

The flexible diagram 1309 may be the same size, shape, and material composition as the flexible diaphragm 1303, or may have a different size (as illustrated in FIG. 13), shape, or material composition. The flexible diagram 1309 may be placed at a location that experiences substantially the same sediment deposits and atomic doping as the flexible diaphragm 1303, or at a location that experiences sediment deposits and atomic doping, but not in the same amounts as the flexible diaphragm 1303.

The separate probe 1307 may include a flexible diaphragm 1309 that has both surfaces exposed to the gas or liquid and thus that should not flex in response to changes in the pressure of the gas or liquid. A sensor system 1311 may sense changes in the flexible diaphragm 1309, including changes caused by sediment deposits and/or atomic doping. The surface with the higher conductance (more exposed) may get a higher degree of sediment than the lower conductance of surface 1309 (less exposed or smaller opening). So, even though both surfaces of 1309 may be exposed to the gas, the surface with the greater conductance to the inlet tube may receive more sediment which may be detected. The sensor system 1311 may be the same type of sensor system used to sense changes in the flexible diaphragm 1303, such as the electrodes 115 and 119 illustrated in FIG. 1A, or any different type of system, such as the strain gauge approach discussed above.

In the event that only one side of the flexible diaphragm 1309 is exposed to the gas or liquid, changes in sediment deposits and/or atomic doping may be detected at one or more non-pressure sensitive locations on the flexible diaphragm 1309 in any of the ways that have been discussed above.

In the event that the flexible diaphragm 1309 is materially different than the flexible diaphragm 1303, or in the event of differences between the degrees of exposure of the flexible diaphragms 1303 and 1309 to the gas or liquid, compensation may be provided by the pressure-insensitive sensor system to compensate for these differences.

Baffles may be used in connection with both diaphragms to insure that they experience equal levels of sediment deposits and/or atomic doping. Examples of such baffles are described in U.S. provisional patent application 61/817,713, filed Apr. 30, 2013, entitled Integrated Baffle for a MEMS pressure sensor, the content of which is incorporated herein by reference.

Except for what has just been described, the various components of the pressure sensor 1301 may be the same as the corresponding components of the pressure sensors 101, 601, 901, 1101, and 1201 illustrated in FIGS. 1, 6, 9, 11, and 12, respectively, as described above, including all of the variations that have been described above.

Figure 14:
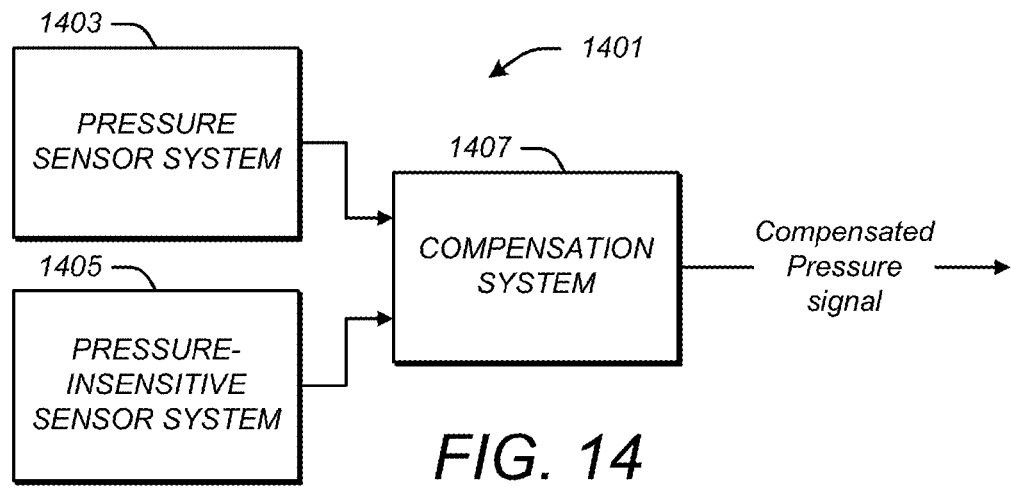
FIG. 14 is a block diagram of an example of a pressure sensor that compensates for changes to the condition of a diaphragm that is part of the pressure sensor.

FIG. 14 is a block diagram of an example of a pressure sensor 1401 that compensates for changes to the condition of a diaphragm that is part of the pressure sensor. The pressure sensor 1401 may include a pressure sensor system 1403 that includes the diaphragm, a pressure-insensitive sensor system 1405, and a compensation system 1407. The pressure sensor system 1403 and the pressure-insensitive sensor system 1405 may be any of the types discussed above. The compensation system 1407 may adjust pressure readings provided by the pressure sensor system 1403, based on damage readings provided by the pressure-insensitive sensor system 1405. The compensation system 1407 may be configured to do so based on experimentally and/or mathematically determined relationships between different levels of damage to the diaphragm and corresponding errors in the readings of the pressure sensitive sensor system 1403. These determined relationships may be transformed into a compensation algorithm that is applied by the compensation system 1407 and/or into a mapping table that maps needed adjustments for measurements made by the pressure sensor system 1403 based on the amount of damage reported by the pressure-insensitive sensor system 1405. The compensation system 1407 may provide this compensation in real time as the pressure sensor 1401 is being used.

Figure 15:
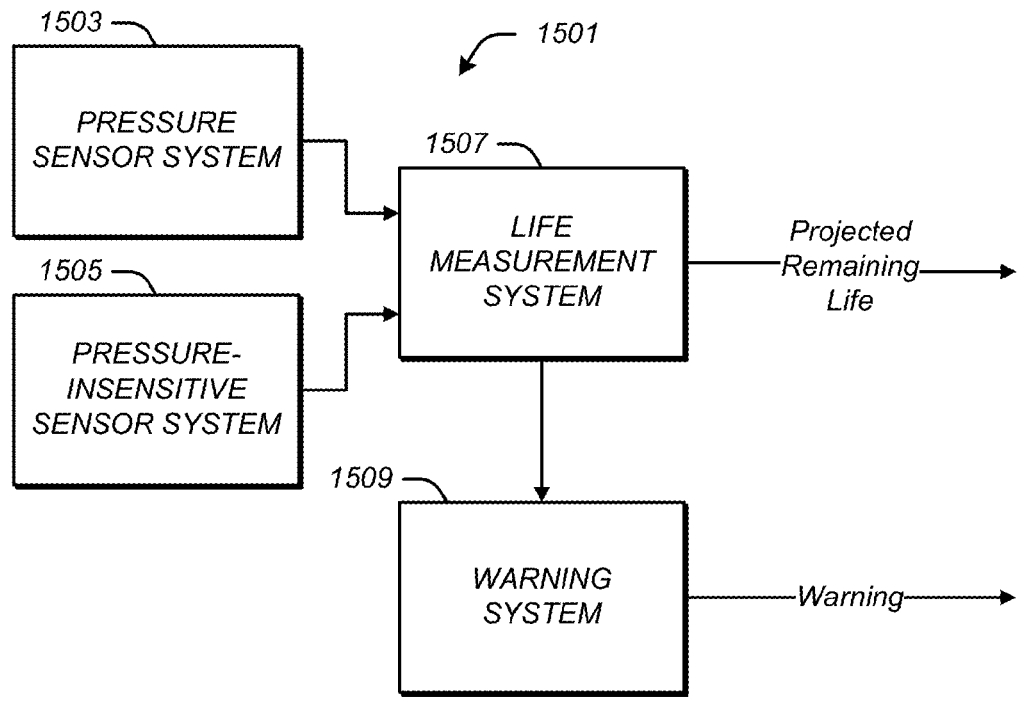
FIG. 15 is a block diagram of an example of a pressure sensor that provides information indicative of a projected remaining life of the pressure sensor and/or a warning when the projected remaining life of the pressure sensor equals or exceeds a threshold.

FIG. 15 is a block diagram of an example of a pressure sensor 1501 that provides information indicative of a projected remaining life of the pressure sensor and/or a warning when the projected remaining life of the pressure sensor equals or exceeds a threshold. The pressure sensor 1501 may include a pressure sensor system 1503 having a diaphragm that gets damaged by sediment deposits and/or atomic doping, a pressure-insensitive sensor system 1505, a life managed measurement system 1507, and a warning system 1509.

The pressure sensor system 1503 and the pressure-insensitive sensor system 1505 may be any of the types discussed above.

The life measurement system 1507 may determine the remaining life of the diaphragm that is used in the pressure sensor system 1503 based on damage readings provided by the pressure-insensitive sensor system 1505. The life measurement system 1507 may equate the end of the life of the diaphragm with when the damage to the diaphragm is reported by the pressure-insensitive sensor system 1503 to have reached a threshold level. The actual damage to the diaphragm may be compared to this threshold and the percentage difference may be reported by the life measurement system 1507 as the remaining life of the diaphragm. A linear or non-linear relationship between changes in the damage and corresponding reported changes in the life may be used. This linear or non-linear relationship may be ascertained experimentally and/or mathematically and implemented with an algorithm and/or a mapping table. The life measurement system 1507 may provide this compensation in real time as the pressure sensor 1501 is being used.

The warning system 1509 may compare information about the remaining life of the sensor system 1501 from the life measurement system 1507 with a threshold and issue a warning when the projected remaining life equals or exceeds that threshold. The warning system 1509 may provide this warning when appropriate in real time as the pressure sensor 1501 is being used.

Unless otherwise indicated, the extrapolation processing systems, compensation systems, life measurement systems, and warning systems that have been discussed herein are implemented with a computer system configured to perform the functions that have been described herein for the component. Each computer system includes one or more processors, tangible memories (e.g., random access memories (RAMs), read-only memories (ROMs), and/or programmable read only memories (PROMS)), tangible storage devices (e.g., hard disk drives, CD/DVD drives, and/or flash memories), system buses, video processing components, network communication components, input/output ports, and/or user interface devices (e.g., keyboards, pointing devices, displays, microphones, sound reproduction systems, and/or touch screens).

Each computer system may be integrated into its respective sensor system or may be separate from it, such as a desktop computer or a portable computer.

Each computer system may include software (e.g., one or more operating systems, device drivers, application programs, and/or communication programs). When software is included, the software includes programming instructions and may include associated data and libraries. When included, the programming instructions are configured to implement one or more algorithms that implement one or more of the functions of the computer system, as recited herein. The description of each function that is performed by each computer system also constitutes a description of the algorithm(s) that performs that function.

The software may be stored on or in one or more non-transitory, tangible storage devices, such as one or more hard disk drives, CDs, DVDs, and/or flash memories. The software may be in source code and/or object code format. Associated data may be stored in any type of volatile and/or non-volatile memory. The software may be loaded into a non-transitory memory and executed by one or more processors.

The components, steps, features, objects, benefits, and advantages that have been discussed are merely illustrative. None of them, nor the discussions relating to them, are intended to limit the scope of protection in any way. Numerous other embodiments are also contemplated. These include embodiments that have fewer, additional, and/or different components, steps, features, objects, benefits, and advantages. These also include embodiments in which the components and/or steps are arranged and/or ordered differently.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

All articles, patents, patent applications, and other publications that have been cited in this disclosure are incorporated herein by reference.

The phrase "means for" when used in a claim is intended to and should be interpreted to embrace the corresponding structures and materials that have been described and their equivalents. Similarly, the phrase "step for" when used in a claim is intended to and should be interpreted to embrace the corresponding acts that have been described and their equivalents. The absence of these phrases from a claim means that the claim is not intended to and should not be interpreted to be limited to these corresponding structures, materials, or acts, or to their equivalents.

The scope of protection is limited solely by the claims that now follow. That scope is intended and should be interpreted to be as broad as is consistent with the ordinary meaning of the language that is used in the claims when interpreted in light of this specification and the prosecution history that follows, except where specific meanings have been set forth, and to encompass all structural and functional equivalents.

Relational terms such as "first" and "second" and the like may be used solely to distinguish one entity or action from another, without necessarily requiring or implying any actual relationship or order between them. The terms "comprises," "comprising," and any other variation thereof when used in connection with a list of elements in the specification or claims are intended to indicate that the list is not exclusive and that other elements may be included. Similarly, an element preceded by an "a" or an "an" does not, without further constraints, preclude the existence of additional elements of the identical type.

None of the claims are intended to embrace subject matter that fails to satisfy the requirement of Sections 101, 102, or 103 of the Patent Act, nor should they be interpreted in such a way. Any unintended coverage of such subject matter is hereby disclaimed. Except as just stated in this paragraph, nothing that has been stated or illustrated is intended or should be interpreted to cause a dedication of any component, step, feature, object, benefit, advantage, or equivalent to the public, regardless of whether it is or is not recited in the claims.

The abstract is provided to help the reader quickly ascertain the nature of the technical disclosure. It is submitted with the understanding that it will not be used to interpret or limit the scope or meaning of the claims. In addition, various features in the foregoing detailed description are grouped together in various embodiments to streamline the disclosure. This method of disclosure should not be interpreted as requiring claimed embodiments to require more features than are expressly recited in each claim. Rather, as the following claims reflect, inventive subject matter lies in less than all features of a single disclosed embodiment. Thus, the following claims are hereby incorporated into the detailed description, with each claim standing on its own as separately claimed subject matter.

The invention claimed is:

1. A pressure sensor for measuring gas or liquid pressure comprising:
   a chamber having an inlet that receives the gas or liquid;
   a flexible diaphragm within the chamber that has a surface that is exposed to the gas or liquid after it flows through the inlet;
   a pressure sensor system that senses changes in the flexible diaphragm caused by changes in the pressure of the gas or liquid; and
   a pressure-insensitive sensor system that senses changes in the flexible diaphragm not caused by changes in the pressure of the gas or liquid and that is insensitive to changes in the flexible diaphragm caused by changes in the pressure of the gas or liquid;
   wherein the pressure-insensitive sensor system comprises:
   multiple local sensors at different pressure-sensitive locations on or within the flexible diaphragm; and
   an extrapolation processing system that extrapolates from outputs of the multiple local sensors changes at a pressure-insensitive location on or within the flexible diaphragm that experiences changes, but not in response to changes in the pressure of the gas or liquid.

2. The pressure sensor of claim 1 wherein:
   the flexible diaphragm has a line of pressure-insensitive locations that each experience changes, but not in response to changes in the pressure of the gas or liquid;
   at least two of the multiple local sensors are located on opposite sides of the line.

3. The pressure sensor of claim 1 wherein:
   the flexible diaphragm has a line of pressure-insensitive locations that each experience changes, but not in response to changes in the pressure of the gas or liquid; and
   at least two of the multiple local sensors are located on the same side of the line.

4. The pressure sensor of claim 1 wherein the extrapolation processing system calculates the stress at the pressure-insensitive location in accordance with the following equation:

$$\frac{\sigma_1' \sigma_2'' - \sigma_1'' \sigma_2'}{\sigma_1' + \sigma_2'' - \sigma_1'' - \sigma_2'} + \sigma_{initial}$$

wherein:
   $\sigma_1'$ and $\sigma_2'$ is an output from one of the multiple local sensors while subject to materially different pressures P1 and P2, respectively;
   $\sigma_1''$ and $\sigma_2''$ is an output from the other of the multiple local sensors while subject to the same materially different pressures P1 and P2, respectively; and
   $\sigma_{initial}$ is any stress that was placed on the flexible diaphragm prior to exposure to the pressures P1 and P2 and that remains on the flexible diaphragm during the exposure to the pressures P1 and P2.

5. The pressure sensor of claim 1 wherein the different pressure-sensitive locations of the multiple local sensors have substantial planar symmetry with respect to a surface of the flexible diaphragm.

6. The pressure sensor of claim 1 wherein the flexible diaphragm is circular and wherein the pressure-insensitive location is on a substantially concentric circle having a radius within the range of 0.63 of the radius of the flexible diaphragm, plus or minus 0.2.

7. The pressure sensor of claim 1 wherein:
   the pressure sensor system includes a variable capacitor that has a capacitance that changes in response to changes in the pressure of the gas or liquid; and
   the flexible diaphragm is made of electrically-conductive material and is part of the variable capacitor.

8. The pressure sensor of claim 1 wherein the pressure-insensitive sensor system includes a strain gauge that has a resistance that changes in response to changes in the flexible diaphragm.

9. The pressure sensor of claim 1 wherein the pressure-insensitive sensor system includes a piezoelectric sensor that has a voltage that changes in response to changes in the flexible diaphragm.

10. The pressure sensor of claim 1 further comprising a compensation system that compensates for errors in measurements made by the pressure sensor system because of changes in the flexible diaphragm not caused by changes in the pressure of the gas or liquid based on changes to the flexible diaphragm sensed by the pressure-insensitive sensor system.

11. The pressure sensor of claim 1 further comprising a life measurement system that provides information indicative of a projected remaining life of the pressure sensor system based on changes to the flexible diaphragm sensed by the pressure-insensitive sensor system.

12. The pressure sensor of claim 11 wherein the life measurement system includes a warning system that issues a warning when the projected remaining life of the pressure sensor system equals or exceeds a threshold.

* * * * *